UNITED STATES PATENT OFFICE.

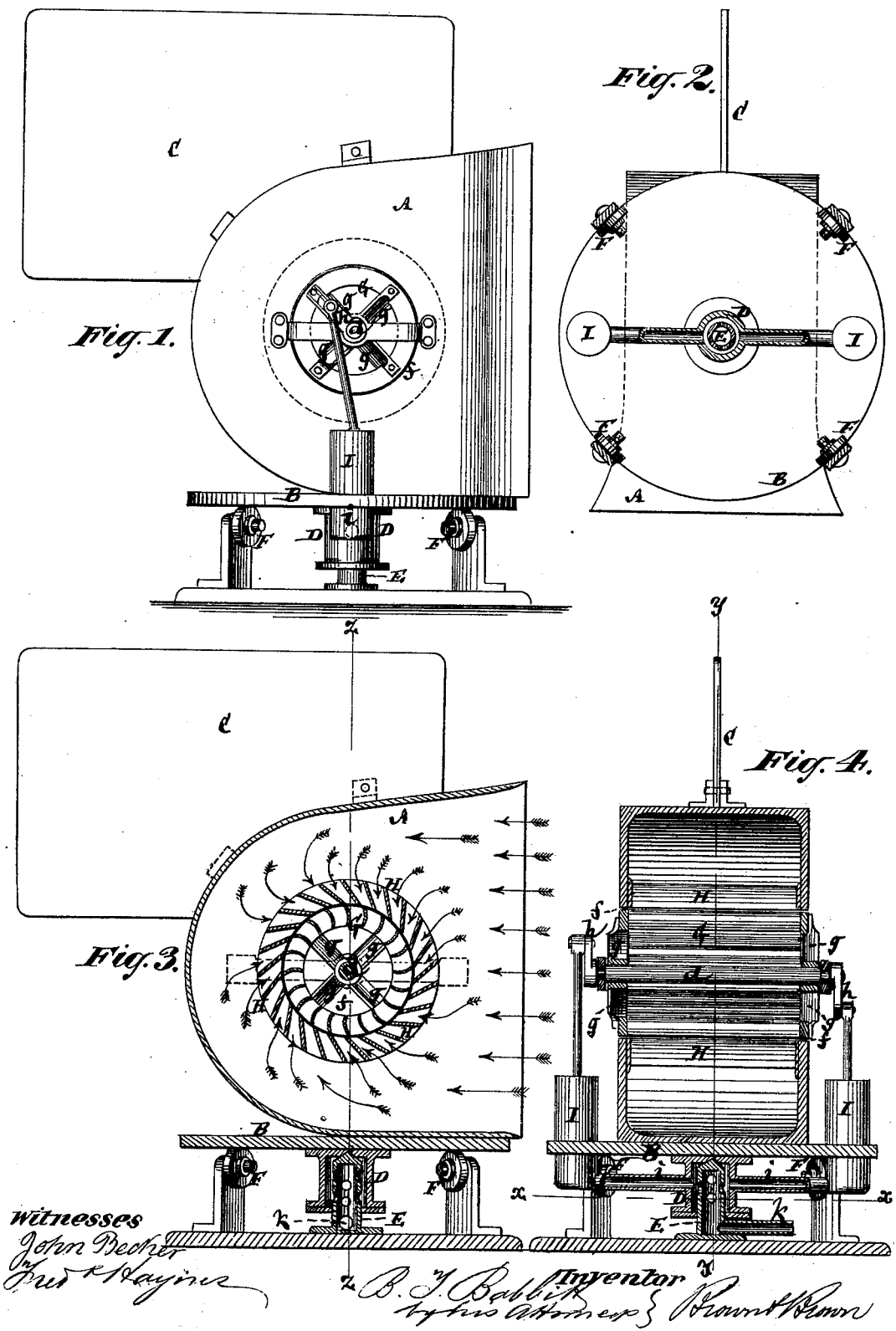

BENJAMIN T. BABBITT, OF NEW YORK, N. Y.

IMPROVEMENT IN WIND-MOTORS.

Specification forming part of Letters Patent No. 219,893, dated September 23, 1879; application filed March 12, 1879.

*To all whom it may concern:*

Be it known that I, BENJAMIN T. BABBITT, of the city and State of New York, have invented certain Improvements in Wind-Motors for Compressing Air and other Purposes, of which the following is a full, clear, and exact description, reference being had to the accompanying drawings, forming part of this specification.

This invention more particularly relates to apparatus for storing power by compressing air through the agency of the wind; and consists of a wind-motor composed of a cowl capable of rotation by the wind, and having exhaust-apertures in it at right angles, or thereabout, to its mouth, a wind or bucket wheel arranged to rotate within said cowl, and provided with oblique arms at its ends within the exhaust-apertures of the cowl, and a circular series of fixed deflectors within the cowl and surrounding the bucket-wheel, whereby a very full utilization of the force of the wind is obtained.

The invention also consists in a combination of a cowl capable of adjustment by the wind, a wind or bucket wheel arranged to rotate within said cowl, one or more air-compressing pumps actuated by said wheel, and a rotating platform having said cowl and pump or pumps secured to it for circular adjustment or rotation collectively by the action of the wind on the cowl.

Furthermore, the invention consists in a combination of a platform arranged to rotate about an upright axis, a cowl fast on said platform, a wind or bucket wheel arranged to rotate about a horizontal axis, pumps operated by said wheel and carried by said rotating platform, and certain devices for supporting the platform and its superincumbent load, and for conveying or passing off the air as compressed by the pumps.

In the accompanying drawings, Figure 1 represents a side elevation of an apparatus constructed in accordance with the invention; Fig. 2, a horizontal section on the line $x$ $x$ in Fig. 4, looking backward; Fig. 3, a vertical section on the line $y$ $y$ in Fig. 4; and Fig. 4, a further vertical section in a plane at right angles to Fig. 3, on the line $z$ $z$.

A is a cowl mounted on a platform, B, made capable of turning, in common with the cowl, about a vertical axis by the action of the wind on a vane, C, attached to the cowl, and whereby the latter is automatically adjusted to face the wind. Attached to the under side of the platform B is a cylinder or stuffing-box, D, that receives up within it a stationary perforated hollow shaft, E, constructed to form a working-center for the platform with the cowl and certain other parts or devices, as hereinafter described, to turn upon. Rollers F F, arranged beneath the platform in proximity to its margin, also serve to steady and support the platform and its superincumbent load.

The cowl A has a wide or flaring mouth to catch the wind, but is of curved or partially-cylindrical form at its back. Arranged to freely rotate within the cowl A is a wind or bucket wheel, G, having a horizontal shaft, $d$. Surrounding said wheel is a circular series of tangentially-arranged deflectors, H, close to the inner ends of which the outer edges of the buckets of the wheel G work. These deflectors are carried by the cowl A, and are stationary in relation with the bucket-wheel, and at a suitable distance from the curved or partially-cylindrical back of the cowl to cause the wind or air, as it rushes into the cowl, or such portion of it as strikes said back, to be turned back and to be directed by the deflectors H against the wheel G, to assist in rotating the latter. The cowl also, by its shape, provides for the air collecting within it being generally distributed by the deflectors H all around the wheel, so as to act upon the several buckets thereof to rotate the wheel in a given direction. After the air has performed its duty on the buckets of the wheel G, it is exhausted or passed off by apertures $f$ in the sides of the cowl, or at right angles to its mouth, and in concentric relation with the wheel G. These exhaust-apertures $f$ are partially closed by the circular ends or rims of the wheel G and by beveling or oblique arms or vanes $g$ at the ends of the wheel, whereby the air, in passing off from the interior of the wheel, acts upon said arms or vanes to assist in the rotation of the wheel, thus contributing to the profitable utilization of the wind entering and collecting within the cowl, and acting first upon the buckets of the wheel G.

Attached to the shaft $d$ of the wheel G are cranks $h$, which serve to give motion by means of rods to the plungers of a pair of air-compressing pumps, I I, carried by the platform B, and which connect by pipes $i$ with the cylinder or stuffing-box D, whereby the air compressed by said pumps is delivered through the perforated stationary shaft E, and by one or more branch pipes, $k$, into a reservoir, to be utilized as required, thus making available the force of the wind, regardless of its changes, to accumulate a motive power or supply of compressed air for whatever purpose it may be required.

In this apparatus it will be seen that the pumps which compress the air, the wheel which gives motion to the pumps, and the cowl all rotate together about an upright axis as the position of the cowl is changed by the changing direction of the wind.

I claim—

1. The combination of a rotating cowl capable of self-adjustment to the wind, and having exhaust-apertures in it at right angles, or thereabout, to its mouth, a wind or bucket wheel arranged to rotate within said cowl, and provided with beveling or oblique arms or vanes at its ends within the exhaust-apertures of the cowl, and a circular series of fixed deflectors within the cowl and surrounding the bucket-wheel, substantially as specified.

2. The combination of a cowl capable of adjustment by the wind, a wind or bucket wheel arranged to rotate within said cowl, one or more air-compressing pumps actuated by said wheel, and a rotating platform having said cowl and pump or pumps secured to it for circular adjustment or rotation collectively by the action of the wind on the cowl, essentially as described.

3. The combination of the platform B, arranged to rotate about an upright axis, the cowl A, fast on said platform, the wind or bucket wheel G, arranged to rotate about a horizontal axis, the pumps I, operated by said wheel and carried by the rotating platform B, the cylinder or stuffing-box D, attached to said platform, the perforated hollow stationary center-supporting shaft E, the pipes $i$, connecting the pumps with the cylinder D, and the outlet or pipe $k$ for the compressed air, essentially as described.

4. The platform-supporting rollers F F, in combination with the perforated hollow stationary center-supporting shaft E, the cylinder or stuffing-box D, the platform B, the cowl A, the wind-wheel G, and the air-compressing pumps I, with their connections, substantially as specified.

B. T. BABBITT.

Witnesses:
T. J. KEANE,
FREDK. HAYNES.